March 12, 1957 T. R. THOMAS 2,784,808
CENTRAL LUBRICANT PUMP
Filed Jan. 5, 1953 3 Sheets-Sheet 1
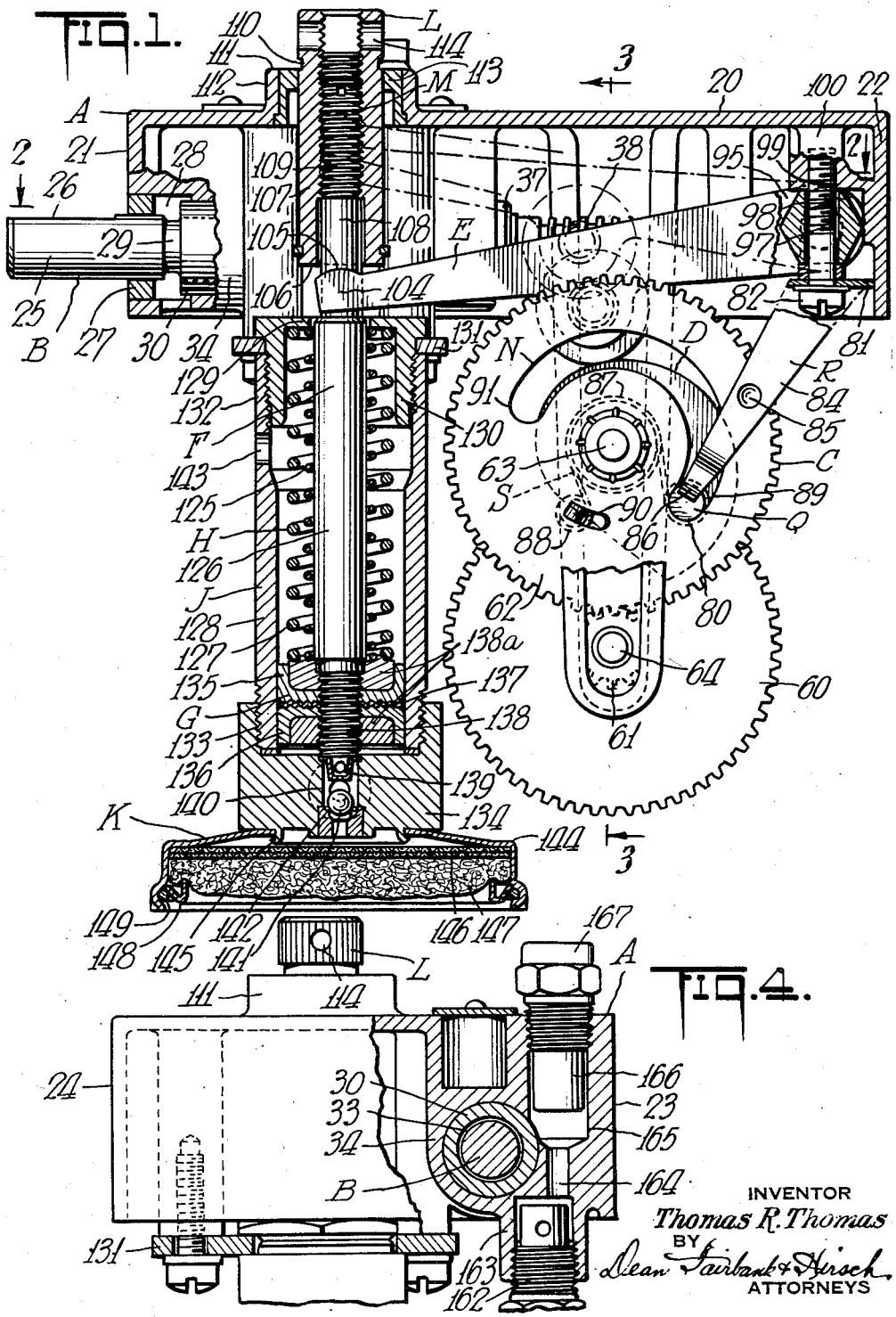
INVENTOR
Thomas R. Thomas
BY
Dean Fairbank & Hirsch
ATTORNEYS March 12, 1957  T. R. THOMAS  2,784,808
CENTRAL LUBRICANT PUMP
Filed Jan. 5, 1953  3 Sheets-Sheet 2
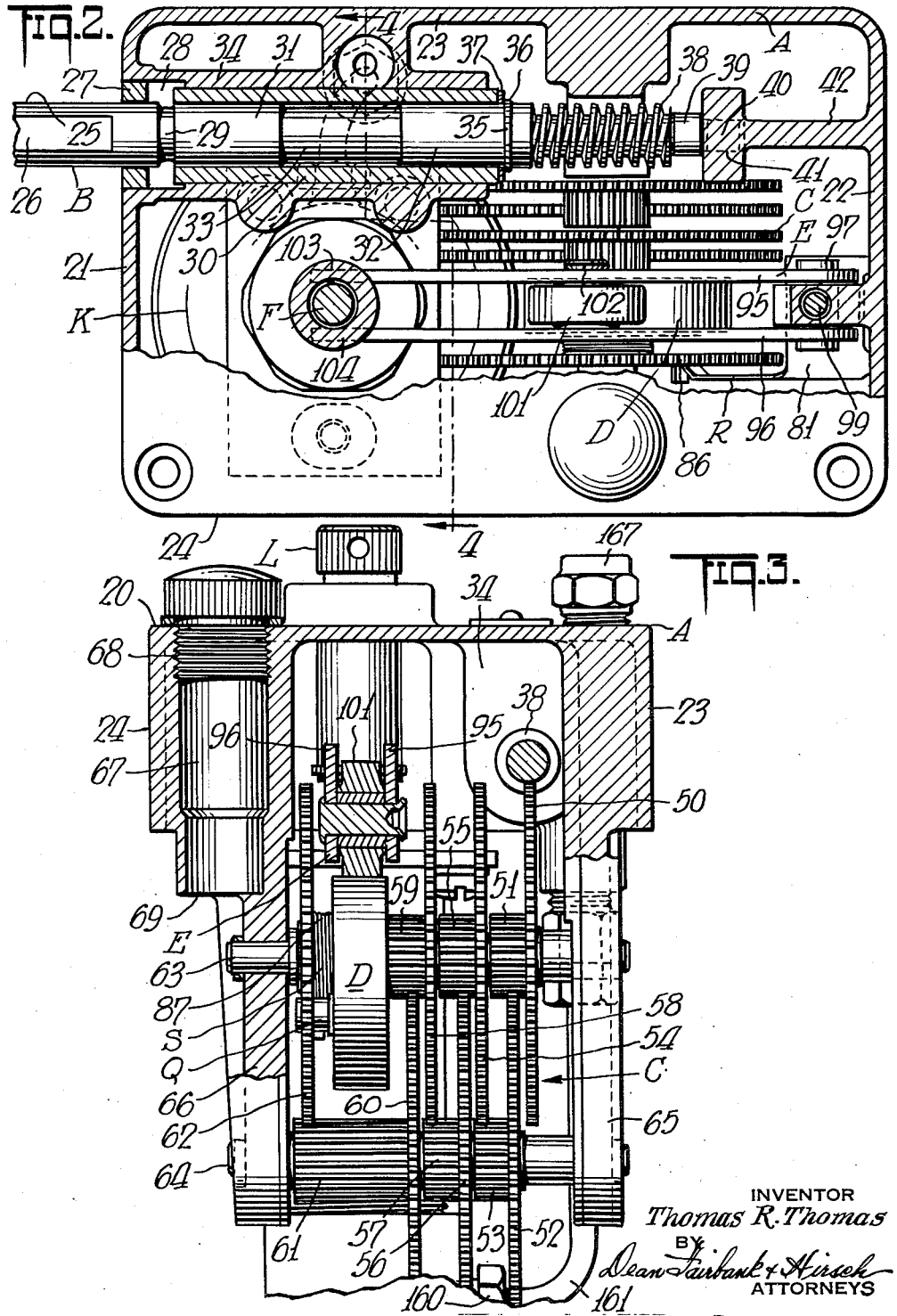
INVENTOR
Thomas R. Thomas
BY
Dean Fairbank & Hirsch
ATTORNEYS

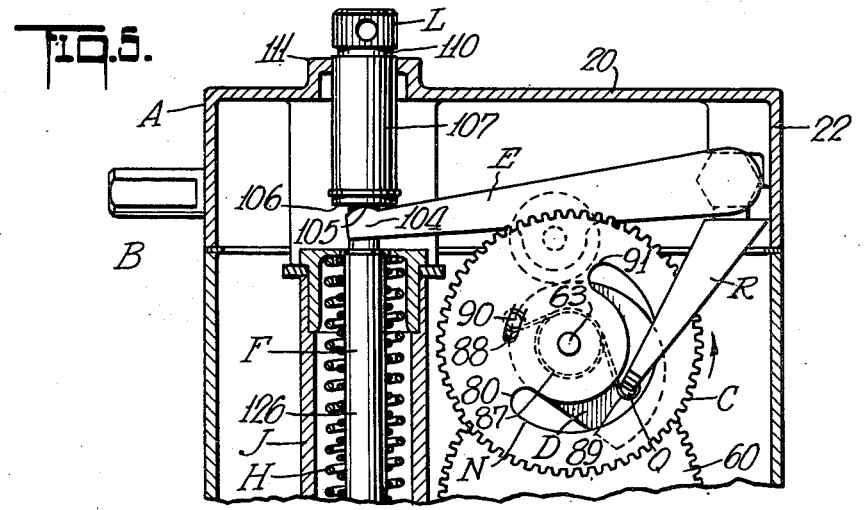
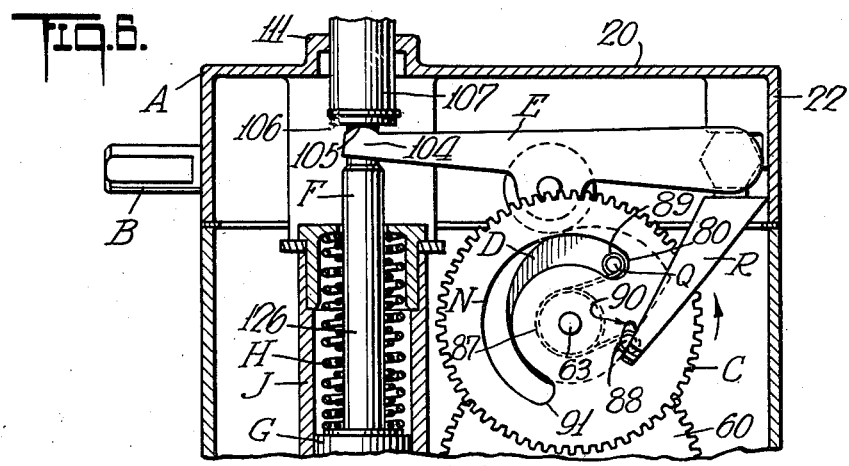
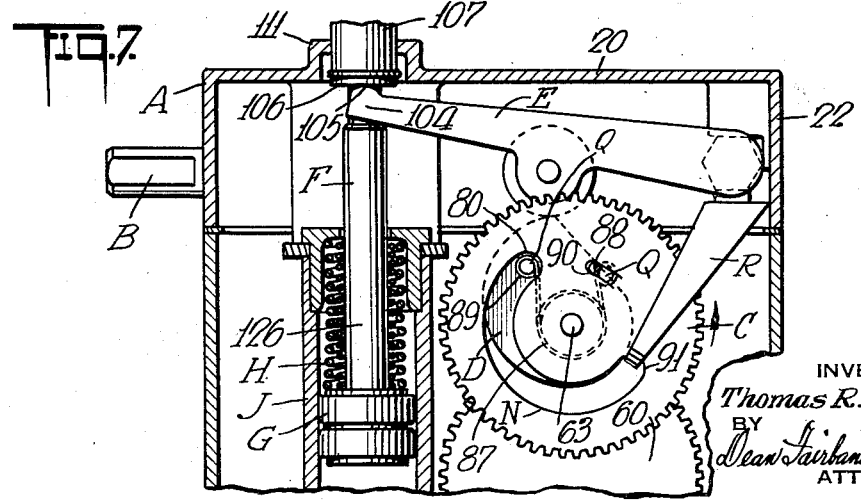

United States Patent Office 2,784,808
Patented Mar. 12, 1957

2,784,808
CENTRAL LUBRICANT PUMP

Thomas R. Thomas, New York, N. Y., assignor to Auto Research Corporation, a corporation of Delaware Application January 5, 1953, Serial No. 329,685

13 Claims. (Cl. 184—27)

The present invention relates to a centralized lubricant pump and it particularly relates to a centralized lubricant pump of the design to be used to feed lubricant intermittently in accurately metered shots to a centralized lubricating system for a mechanism, the scattered and diverse bearings of which require accurately proportioned amounts of lubricant, depending upon their needs and depending upon the frequency of operation and the continuity of operation of the mechanism.

It is among the objects of the present invention to provide a small compact, automatically actuated central lubricant pump for a branched lubricant distributing system, which pump will operate in accordance with the needs of the bearings of the mechanism to be lubricated, and which will feed lubricant intermittently to such bearings in predetermined proportions and quantities, regardless of the height of said bearings, the varying distance of said bearings from the central pump and the varying clearance or tightness or looseness of said bearings.

Another object of the present invention is to provide a centralized lubricant pump which will enable a manual shot of lubrication to be supplied to the bearings as desired intervals, as for example at the commencement of operation or after long standdown periods, without interfering with the automaticity of the pump operation, and at the same time without the manual operation being limited by the automatic drive or the position of the automatic drive of the pump mechanism.

A still further object is to provide an automatic pump arrangement which will permit a manual feed to the centralized lubricating system without regard to the automatic drive, and with assurance that a predetermined full supply of lubricant will be supplied to the machine and to the various bearings through the central branch system when desired and particularly at the commencement of operation.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory to provide a small compact pump having a relatively large packed piston plunger, in which the piston plunger and the drive will be carried by a cover for the pump reservoir and will largely depend into the lubricant body from the cover.

Normally the drive will take place through the driving shaft extending across the cover and through a gearing arrangement or a train of gears, which will cause the pump piston to be operated or elevated at predetermined intervals, depending upon the amount of operation of the machine.

This is normally accomplished by means of a shaft extending across the cover, having a worm and gear drive, to a gear train consisting of a plurality of large gears and pinions to give a suitable reduction. These gears and pinions are usually supported on two horizontal shafts extending transversely above and below each other between two supporting brackets depending from the cover structure.

The upper and lower shafts of the gear train drive extend transversely to the upper or main drive shaft extending horizontally through the cover. The end of the gear train drives a cam, which in turn actuates a lever to lift and release the piston. The release of the piston will permit a stressed spring to drive the piston downwardly and force a charge of lubricant into the branched distributing system.

A particular feature of the present invention resides in a construction to enable an optional full manual stroke regardless of the position of the cam, and this is accomplished by providing the cam with a pin slot connection to the last or final gear element, which will permit the cam to rotate freely out of the way when a manual stroke is being effected. In this way a full stroke may take place without the cam follower lever stopping against the top lobe of the cam and limiting the stroke. By the use of such a loose cam pin and slot drive, together with a torsion spring, it is possible to cause the cam freely to advance out of the path of the follower upon manual actuation to permit free descent of the piston when manually lifted and a full cylinder lubricant discharge into the distributing lines.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes variations and modifications can be resorted to which fall within the scope of the claims hereunto appended.

In the drawings wherein like reference characters denote corresponding parts throughout the several views:

Fig. 1 is a side sectional view of a cover of a pump construction according to the present invention, showing the cylinder and piston in cross section, and also a side view of the top horizontal main drive shaft, together with an end view of the gear train arrangement.

Fig. 2 is a transverse sectional view upon the line 2—2 of Fig. 1, showing the main horizontal drive shaft as well as the gear train drive.

Fig. 3 is a vertical transverse sectional view upon the line 3—3 of Fig. 1, showing the gear train drive and the cam arrangement.

Fig. 4 is a fragmentary transverse sectional view upon the line 4—4 of Fig. 2, particularly showing the feed of lubricant to the upper horizontal shaft.

Figs. 5, 6 and 7 are diagrammatic vertical sectional views similar to Fig. 1, showing different positions of the cam and piston during a cycle of operations.

Referring to Figs. 1 to 4, there is shown a cover A taking the form of a rectangular inverted cup member, a main horizontal shaft drive B, a gear train C, a cam D with a split follower arm E, a piston shaft or connecting rod F, a double cup piston G and a double return drive spring H.

The cylinder J depends from the cover and supports the inlet filter arrangement K. The manual actuator arrangement L projects above the cover. There is a stroke adjustment M.

The particular features of the present invention, which enable a full stroke upon manual operation, is the elongated slot N, receiving the driving pin Q stopped by the resilient arm R. The torsion spring S acts to throw over the cam when the manual operator L is employed.

Referring particularly to Figs. 1, 2 and 3, there is shown a cover A of rectangular shape, with a flat top 20 and with the depending side walls 21, 22, 23 and 24.

The drive shaft B has the outwardly projecting portion 25 with a flat 26 which projects through a bearing ring 27 in the wall 21 of the cover A. The shaft then projects through the recess 28 (see Figs. 1 and 2) where it is provided with the groove 29. The shaft then passes through the bearing sleeve 30, preferably of a porous metal. Inside of the bearing sleeve 30 the shaft has the enlarged portions 31 and 32, between which is the reduced diameter portion 33.

The sleeve 30 is held in the frame portion 34, which depends from the interior of the top 20 of the cover A. Beyond the sleeve 30 the shaft has a groove 35 receiving the spring ring 36, which bears against the washer 37.

The end of the shaft is cut into a thread or worm 38. Abutting the worm 38 is a pin 39 which has a reduced diameter portion 40 press fitted into the reamed hole 41 on the end of the web 42.

The worm 38 meshes with the first gear 50 of the gear train C. The gear train has a plurality of gear and pinion combinations, which mesh with each other in the following order, namely; gear 50 and pinion 51; gear 52 and pinion 53; gear 54 and pinion 55; gear 56 and pinion 57; gear 58 and pinion 59; gear 60 on the elongated pinion 61 and final gear 62 which drives the cam D.

The gear units 50—51, 52—53, 54—55, 56—57, 58—59 and 60—61 are all formed as single units.

Gear units 50—51, 54—55 and 58—59, as well as the driving gear 62, ride upon the upper parallel gear train shaft 63.

Gear units 52—53, 56—57 and 60—61 ride upon the lower parallel gear train shaft 64. These shafts are carried at their ends in the depending arms 65 and 66, extending downwardly from the cover A into the reservoir housing, not shown.

The depending arm 66 also forms the lubricant inlet opening 67, which has an upper tapped portion 68 and a lower opening 69 to feed lubricant into the reservoir.

The cam D is also mounted upon the upper shaft 63. The cam D is driven through the pin Q, which fits in the slot N.

It will be noted by reference to Fig. 1, that the slot N extends at least 180° around the cam driving gear 62. Normally the pin Q will be held against movement by the nose like end 86 of spring arm R until the end 80 of slot N contacts pin Q.

The resilient arm R, which is shown in side view in Fig. 1 and in top view in Fig. 2, extends obliquely downwardly, and it has a top flat portion 81, held in position by the screw 82 and aligned by the lower extension of wall 22 of cover A.

The oblique flat portion 84 of the arm R has a dimple 85 and an inturned portion 86. When the end 80 of the slot N picks up the pin Q, it will drive it against the depressed angular portion 86 of the arm R, which fits in the slot N, which will be forced outwardly so that the pin may move past the portion 86 of the arm R. In this position the torsion spring S is stressed, ready to advance cam D upon manual operation.

The torsion spring S has a central coiled portion 87 around the shaft 63, and it has the end loops 88 and 89. The end loop 89 fits around the stud Q, while the end loop 88 hooks around an ear 90 on the inside face of the driving gear 62. This spring will tend to throw the cam D over as soon as the stud Q is forced past the portion 86 of the resilient arm R, but it will be held back by the follower arm E and the double return spring H, and it will only be permitted to advance the cam D when the pressure of the double spring H, acting through the arm E, is relieved by manual actuation at L.

Referring to the follower arm E, this follower arm has the side plates 95 and 96, which are mounted on the shaft 97 in the structural element 98. The structural element 98 is held in place by the screw 82, the extension of which fits into the threaded portion of the box 100 depending from the inside of the cover A. Between the arms 95 and 96 is the cam follower roller 101, carried on the stud shaft 102. The ends 103 and 104 of the arms 95 and 96 have the rounded upper ends 105 for contacting the lower edge or end 106 of the sleeve 107.

The sleeve 107 is fitted upon the upper reduced diameter portion 108 of the connecting rod F. The portion 108 receives the threaded element 109, which permits the sleeve 107 to be moved upwardly and downwardly upon the threaded portion 109 and thereby adjusting the stroke of the piston. The upper end of the sleeve 107 has the circular or peripheral groove 110, which normally projects or is positioned right above the top surface 111 of the box 112. The box receives an insert 113, with an inturned portion acting as a bearing against the sleeve or around the sleeve 107. The groove 110 permits application of a lifting tool to lift the piston G and give a manual stroke.

The through opening 114 permits the insertion of a tool or rod to lift the connecting rod F and the piston G to give a manual stroke.

When this occurs, the double spring H is released from the arm E and the cam D is advanced by the stressed torsion spring S, so that the low point of the cam D will be opposite the follower roller 101, permitting a full down stroke of the piston G.

The spring structure H consists of an inside small diameter spring 125, which closely encircles the central portion 126 of the connecting shaft F and an outside large diameter spring 127. These springs encircle the shaft 126 inside of the main cylinder portion 128 of the cylinder body J. The springs extend upwardly and react at their upper ends against the inturned portion 129 of the thimble 130.

Tightly clamped between the upper end 132 of the cylinder J and the thimble 130 is the mounting plate 131.

Near the upper end of the cylinder J, and below thimble 130 is the transverse vent hole 143.

The lower portion of the cylinder has the thread connection 133 into valve block 134.

The piston G is formed of upper and lower cups 135 and 136, with an intervening disk 137, which are held on the threaded extension 138 of the connecting rod F by means of two nuts 138a. The chamber 140 in the block 134 contains ball retainer 139 above the ball check 141. The lower portion of the chamber 140 is closed off by the check valve seat 142.

The cup 144 of the filter or strainer K is held in position by the peaned over portion 145. At the base of the cup 144 are the double screens 146, against which is held the fibrous strainer 147. The strainer 147 is held in position by the retaining ring 148 and the spring ring 149.

Upon a stroke of the pump, the lubricant will be forced upwardly through an outlet connection 160 into the tubing 161 and into the outlet fitting connection 162 screwed into the recess 163 in the cover A (see Figs. 3 and 4).

The lubricant will then flow through the passageway 164 and fill the chamber 165, from which the bushing 30 will be saturated with lubricant. The lubricant will then pass from the chamber 165 into the outlet fitting 166, at which external connections are made at 167 to the outside tubing system.

The most important feature of the present invention resides in the cam release when the manual actuator L is elevated to give an initial manual shot, which results when the cam D is thrown over by the torsion spring S, so that the high lobe of the cam will not be under the roller or follower 101.

Therefore, the manual downstroke will not be limited by the position of the cam D, and assurance is had that a full manual stroke will take place whenever the manual actuator L is operated. This is accomplished by the long 180° slot N, so that the cam D may be rotated independently and sufficiently of the gear train C by means of the torsion spring S.

The cantilever spring R retards the cam through the stud Q just before it contacts the follower roller 101, thus allowing the torsion spring S to load as the gear train rotates. The spring R is sufficiently strong to resist the loading of the torsion spring S, and it will hold back the cam D until the trailing end 80 of the slot N has advanced and made contact with the cam pin. As the gear 62 drives the pin or stud Q past the finger spring R, the cam D then will make contact with and lift the follower roller 101 and also lift the cam lever E and the connecting rod F with piston G against the double springs H.

When the piston G is elevated to its maximum up-position by the manual member L when the follower 101 is upon any elevated portion of the cam D, then the action of the torsion spring S will cause the cam to advance until the stud or pin Q contacts the forward end of the gear slot N at 91. Thus, there will be no interference between the cam follower roller 101 and the cam D during the descent of the piston G after manual actuation, and the piston G is free to make a full down stroke.

The cam D may be made of pressed powdered metal and will absorb lubricant and thus lubricate the follower roller 101. The cam pin Q is preferably pressed into a recess or opening in the cam D.

In normal automatic operation or with manual actuation, from 50 to 150 bearings may be readily lubricated from the pump of Figs. 1 to 4, each through a high restriction flow metering element at the bearing or adjacent to the bearing with an inlet strainer, a pin restricted central bore and an outlet check valve, one meter unit being desirably provided for each bearing so that the lubricant discharge from the pump piston G will be accurately proportioned in accordance with the requirements of each bearing.

As the piston G rises, it will draw in lubricant through the strainer K and pass the inlet check valve 141. At the top of the stroke of the piston G, a specific volume of oil will trapped in the pump cylinder J, then as the lobe of the cam D passes under the follower roller 101, releasing it, the piston tends to descend rapidly under the action of the stressed springs H. This descending action of the piston G will close the ball check 141 and force a measured quantity of lubricant through the outlet connection 167.

The manual actuator L permits rapid filling of the distributing lines and oiling of the bearings at time of machine assembly or upon starting the machine after a period of inactivity.

The cantilever finger spring R in one preferred embodiment may have a length of about 1½ inches and may be formed of .020 inch thickness annealed spring stock.

The torsion spring S may be formed of .021 inch thickness music wire with about 4 turns right hand and with the axial length of the coils not exceeding .119 inch and with 194° working range and 241° maximum deflection.

The varying positions of the cam D, the lever E, the piston rod F and the piston G are shown in Figs. 5, 6 and 7.

Fig. 5 shows the piston substantially at the lowest part of its stroke; Fig. 6 shows the piston in an intermediate position of its stroke; and Fig. 7 shows the piston in the highest position.

In any one of these stroke positions, if a manual actuating device is applied to lift the piston, the piston may take a full stroke from a position as shown in Fig. 7.

While there has been herein described a preferred form of the invention, it should be understood that the same may be altered in details and in relative arrangement of parts within the scope of the appended claims.

Having now particularly described and ascertained the nature of the invention, and in what manner the same is to be performed,

What is claimed is:

1. A central lubricating pump having a cover, a drive shaft mounted on said cover, a depending tube from said cover, a reciprocating piston in said tube, a gear train including a plurality of horizontal shafts carrying intermeshing gear and pinion combinations driven from said drive shaft, depending brackets carrying said horizontal shafts, a cam driven by said gear train, an actuating lever driven by said cam for operating said piston, a manual operator to lift said piston, and an elongated slot and pin drive between said gear train and said cam, and a torsion spring to swing the high point of said cam from below said lever upon operation of said manual operator.

2. A central lubricating pump having a cover, a drive shaft mounted on said cover, a depending tube from said cover, a reciprocating piston in said tube provided with a return spring, an inverted filter cup carried by said tube, a gear train including a plurality of horizontal shafts carrying intermeshing gear and pinion combinations driven from said drive shaft, depending brackets carrying said horizontal shafts, a cam driven by said gear train and an actuating lever driven by said cam for operating said piston, manual means for operating said piston at will and means to release said cam and to swing the high point of said cam from below said actuating lever when said manual means is operated.

3. A central lubricating pump having a cover, a drive shaft mounted on said cover, a depending tube from said cover, a reciprocating piston in said tube provided with a return spring, an inverted filter cup carried by said tube, a gear train including a plurality of horizontal shafts carrying intermeshing gear and pinion combinations driven from said drive shaft, depending brackets carrying said horizontal shafts, a cam driven by said gear train, an actuating lever driven by said cam for operating said piston, means for adjusting the piston stroke, a manual operator and means for releasing the high point of said cam from below said lever upon operation of said manual operator.

4. A central lubricating pump having a cover, a drive shaft mounted on said cover, a depending tube from said cover, a reciprocating piston in said tube provided with a return spring, an inverted filter cup carried by said tube, a gear train including a plurality of horizontal shafts carrying intermeshing gear and pinion combinations driven from said drive shaft, depending brackets carrying said horizontal shafts, a cam driven by said gear train, an actuating lever driven by said cam for operating said piston, means for adjusting the throw of said lever, said piston having an extension through said cover, said extension serving as a manual operator, and means to swing the high point of said cam out of the way of said lever upon operation of said manual operator.

5. A central lubricating pump having a cover, a drive shaft mounted on said cover, a depending tube from said cover, a reciprocating piston in said tube provided with a return spring, an inverted filter cup carried by said tube, a gear train including a plurality of horizontal shafts carrying intermeshing gear and pinion combinations driven from said drive shaft including a last driving gear, depending brackets carrying said horizontal shafts, a cam driven by said last drive gear of said gear train and an actuating lever driven by said cam for operating said piston, said cam having a lost motion connection to said gear train, said piston having a manual operator and said lost motion connection including an elongated slot in the driving gear of said gear train, and a torsion spring to drive the high point of said cam out of the way of said lever upon manual operation of the piston.

6. An automatic central lubricant pump of the type having a coil spring return reciprocating piston and manual and automatic means to move said piston against said spring to charge the pump, said automatic means including a follower lever to move the piston, a cam to move the follower lever and a gear to move the cam, said pump including a lost motion connection to enable optional full manual stroke, said connection being between the cam and gear and said connection including a stud pin projecting from the side of the cam, said gear having an elongated arcuate slot receiving said pin, a holder to control movement of the pin until the end of the slot contacts the pin and drives the cam through said pin past said holder, and a spring associated with the cam and gear to throw over the cam when driven past said holder, said cam having a high point and said lever having a roller contacting said cam and said cam being moved by said spring when said high point of the cam passes the roller without manual operation of the lever.

7. The pump of claim 6, said piston having an elongated connecting rod, an intermediate portion of said connecting rod having a means to engage the end of the lever and the end of said connecting rod having means to engage a manual actuator.

8. The pump of claim 6, said lever having a boss end for actuating said piston, said coil spring having two concentric members stressed upon actuation of said piston by either said manual or automatic means.

9. The pump of claim 6, said holder consisting of a resilient arm having an inturned end portion to contact said pin during its movement.

10. The pump of claim 6, said spring having a central coil portion and having ends respectively connected to the cam and the gear and said spring being stressed when said gear is advanced without advancing said cam and said spring being unstressed when said cam is released by said lever upon manual operation.

11. An automatic reciprocating plunger, spring returned central lubricant pump of the type having an optional manual actuator and a piston provided with an actuating lever to move the piston upwardly in a charge movement and a coil spring charged upon said charging movement to subsequently move the piston in a discharge movement, a cam operating said lever and a gear wheel drive for operating said cam, said cam and gear-drive having a lost motion connection to permit said piston to take a full stroke upon operation of said manual actuation, said cam and gear wheel respectively having a stud and arcuate slot receiving said stud, means to retain said stud in a fixed position without movement in said slot until the gear has moved to a position to directly drive said cam and means to move said cam to full discharge stroke position after completion of said charging movement.

12. The pump of claim 11, said means to retain said stud including a spring finger mounted upon the fixed structure of said pump and projecting toward and partly into said slot.

13. The pump of claim 11, said manual actuator consisting of a threaded adjustment extending in alignment with said piston and said lever also being provided with an adjustable pivot mount to control said charge and discharge movement.

References Cited in the file of this patent
UNITED STATES PATENTS

| | | |
|---|---|---|
| 2,145,245 | Bijur | Jan. 31, 1939 |
| 2,245,860 | Hunting | June 17, 1941 |
| 2,308,815 | Kocher | Jan. 19, 1943 |